June 1, 1926.
J. C. SHAW
CONTOURING TRACER
Filed Dec. 4, 1922
1,587,190
2 Sheets-Sheet 2
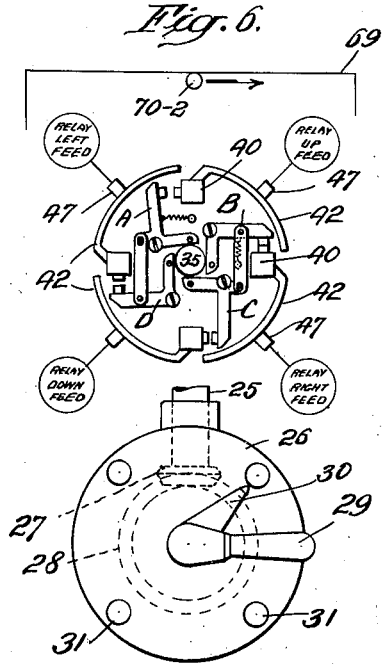
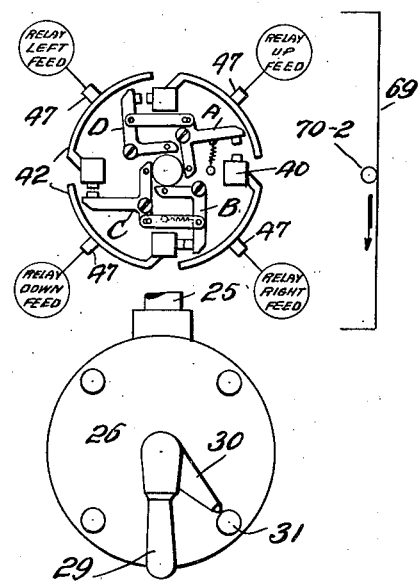
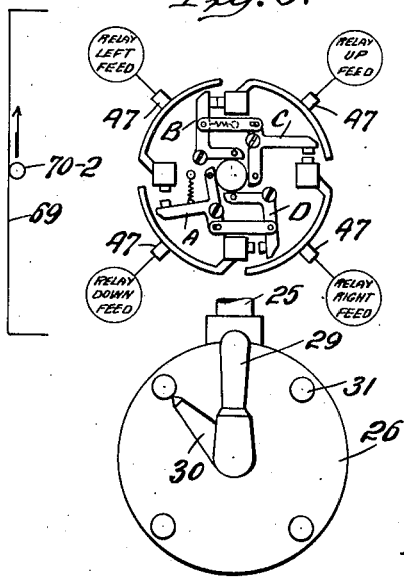
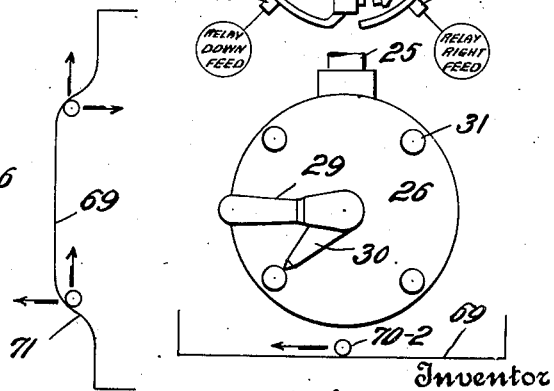
Inventor
John C. Shaw
By his Attorney
M. H. Lockwood Patented June 1, 1926.

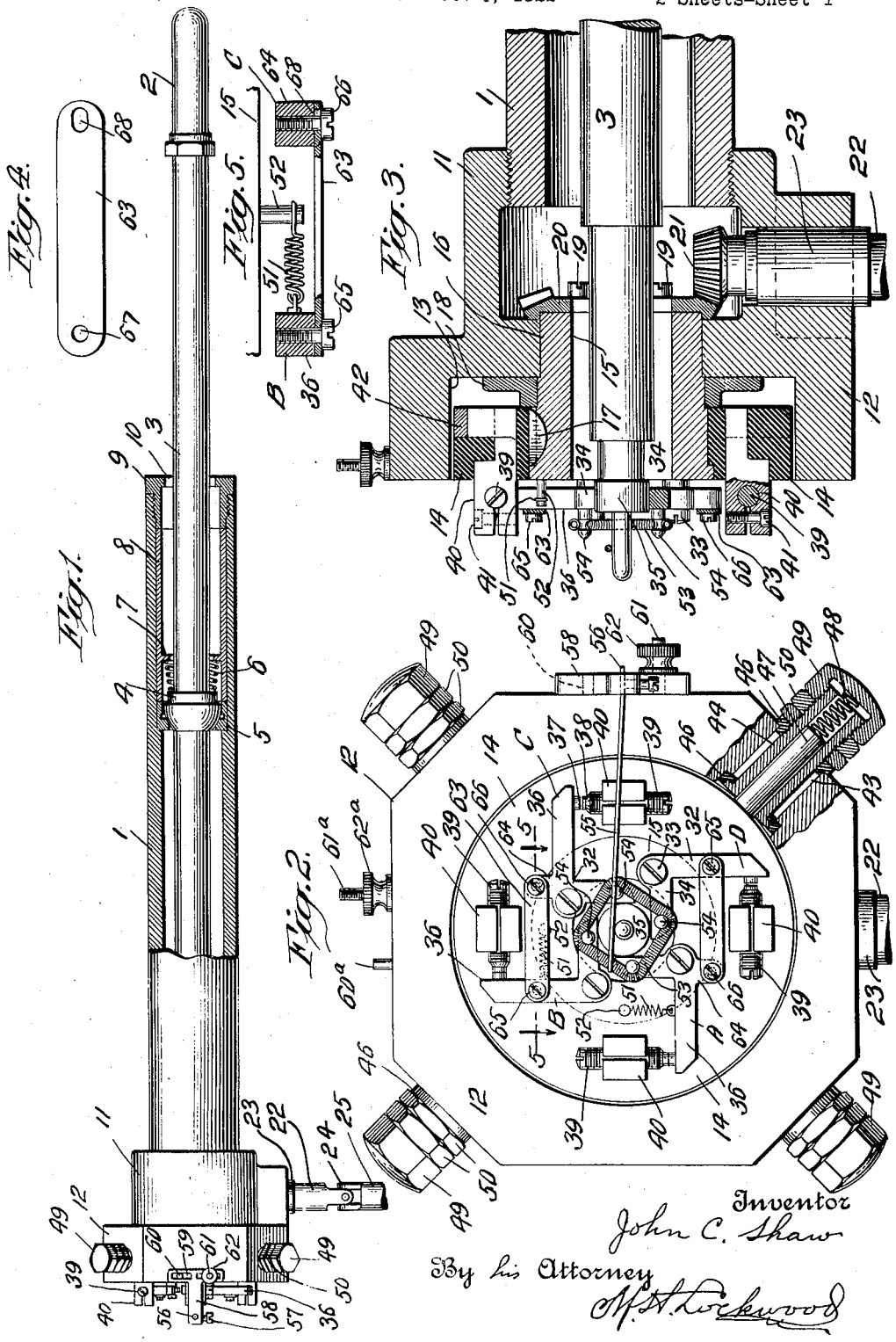

1,587,190

UNITED STATES PATENT OFFICE.

JOHN C. SHAW, OF BROOKLYN, NEW YORK, ASSIGNOR TO KELLER MECHANICAL ENGINEERING CORP., OF BROOKLYN, NEW YORK, A CORPORATION OF NEW YORK.

CONTOURING TRACER.

Application filed December 4, 1922. Serial No. 604,923.

My invention relates more particularly to a contouring tracer, which is provided with means for the electrical or other power control of a cutter or suitable incising tool adapted for feed relative to the work in reproducing thereon the contour of the pattern which is adapted to be followed by the tracer point.

The reproduction of the contour or profile of objects or designs of various shapes in a single plane is frequently desired and, when the work is to be reproduced in duplicate, a suitable pattern is prepared and arranged to be followed by the tracer point, the movements of which will control the movements of a suitably mounted and operated cutting tool so as to reproduce the pattern in the work. Obviously, a contouring tracer and its cooperating cutting tool may be operated in connection with machines of various types, such as milling machines, lathes, slotters, planers and other types of machines, in which the relative feed between the cutter and work may be suitably controlled. However, the improved contouring tracer as herein shown and described is more particularly adapted for use in connection with engraving machines of the type shown and described in my Patent No. 1,506,454 of Aug. 26, 1924.

In the application referred to above, the tracer is adapted to follow the pattern not only in planes at right angles to the axis of the tracer, but also in planes parallel thereto, and any longitudinal or lateral movement of the tracer point is adapted through suitable electrical contacts and relays to control the relative feed of the cutter and work by means of electro-magnetic clutches and gear connections, with ordinary screw feeds. It will be obvious, however, that other power controls than electricity may be employed, such as compressed air or fluid transmission, but because of its simplicity and well-known efficiency, the electrical control is preferable.

In my Patent No. 1,518,114 of Dec. 2, 1924, I have shown and described an improved universal electric tracer which can be used for contouring work or my present improved contouring tracer may be mounted upon the same head and operated by the same tracer point and tracer bar, but for contouring or profiling work alone, the present form is preferable, in that only those parts that are required in the contouring tracer are present. Therefore, one object of my present improvement is to provide a contouring tracer, in which the tracer bar is provided with a tracer point at one end adapted to follow the contour to be reproduced while the other end of the tracer bar is adapted to open or close electrical contacts, controlling the relative feed between the cutter and work in four rectilinear directions in a plane at right angles to the axis of the tracer.

In reproducing a flat pattern, it is only necessary for the tracer to follow the contour of the pattern, and therefore, the tracer point need not have a longitudinal movement, but should be permitted a universal movement at right angles to the axis of the tracer bar, hence a further object of my present improvement is to provide a plurality of contact closing members adapted to be operated only by lateral movement of the tracer bar. The plurality of such contact members provided are preferably arranged in a circle about the end of the tracer bar, and since four rectangular feeds in a plane will take care of the complete contour, for such contact controlling members are preferably arranged 90° apart around the end of the tracer bar, and each is adapted to control the feed in one direction. Thus, with this arrangement, the relative feed between the cutter and the work can be completely controlled, for the closing of a contact controlling the feed in any one direction will permit the feed to take place in that direction, be it either up or down or to the right or left and, if two adjacent contacts are simultaneously closed, the relative feed will be at an angle of 45°, (if the rate of feed in the two directions at right angles is the same) for both feeds would operate at the same time.

Another object in connection with my improved contouring tracer is to provide mechanism for not only insuring the proper operation of the various feeds, through the operation of the contact carrying members, but also to provide means for opening or breaking such contacts under certain conditions to thereby prevent accidents or injury to the work when the contacts are not properly or suitably operated by the tracer bar.

In the operation of a contouring tracer of this character, it is obvious that for a given setting of the machine the tracer can control the relative movement between the cutter and work in only two directions at a time, and, therefore, in following a closed contour, it is necessary to either automatically or manually change the relation between the contact carrying members and the tracer bar, so as to bring into action the feeds necessary to follow the contour of the pattern and bring the tracer back to the original starting point. Various switch mechanisms, such as the well-known drum type of switch may be employed for changing the electrical connections between the contact carrying members and the relays operating the magnetic clutches, but preferably, a further object of my improvement is to incorporate in the tracer head itself, means which may be manually or otherwise operated for changing the relation between the contact carrying members and the tracer bar to accomplish the required change in the direction of feed to be controlled.

These and other objects have been carried out in my improved contouring tracer, one form of which is more particularly shown and described in the accompanying drawings, in which Fig. 1 is a side elevation of the contouring tracer, with the tracer bar supporting tube or body of the tracer partially in section; Fig. 2 is a front view in elevation of the tracer head, with one corner broken away to show details of the contact brushes; Fig. 3 shows a central vertical longitudinal section of the tracer head, shown in Fig. 2; Figs. 4 and 5 show details of the connecting links between contact carrying members; Fig. 6 shows diagrammatically, the arrangement when the tracer control is such that the feed is toward the right; Fig. 7 is a similar view, when the tracer control is such that the feed is down; Fig. 8 is a similar view, when the tracer control is such that the feed is toward the left; Fig. 9 is a similar view, when the tracer control is such that the feed is up and Fig. 10 shows diagrammatically an irregular contour, in which the feed at certain points may take place in two directions.

Referring to the accompanying drawings, it will be seen that my improved contouring tracer comprises a tubular body or supporting member 1, which may be clamped on an engraving or other suitable machine, in position to cooperate with the desired pattern. The tracer point 2 is mounted upon a tracer bar 3 supported by a ball and socket joint in the tubular supporting member or body 1, the tracer point and protruding therefrom, as indicated in Fig. 1 of the drawings. Any suitable pivotal support may be provided for the tracer bar 3, but preferably this consists of a ball and socket joint, so as to permit universal lateral movement of the tracer point 2. A hemispherical member 4 is suitably secured to the tracer bar 3, at about the middle of its length and this finds a bearing in the hemispherical socket 5, the ball portion being held against displacement in the socket by means of a compression spring 6, which thrusts at one end against the ball member 4 and with the other end against an inwardly extending ledge or annular flange 7 on a tube 8 fitting in the outer end of the body or supporting member 1 as indicated in Fig. 1 of the drawings. A suitable annular thimble 9 is screw threaded into the end of the tubular member or body 1 against the tube 8 and, therefore, serves as a means for holding the spring 6 in position to hold the tracer bar 3 in its socket, the spring being of sufficient strength to overcome the weight of the tracer bar and tracer, if the device should be mounted in a vertical position. The hole at 10 in the thimble 9 of course should be large enough to permit the necessary lateral movement of the tracer bar 3 in any direction.

In the present form of the device, a suitable hollow head 11 is mounted upon the forward end of the tubular member or body 1, and this head is preferably provided with an enlarged flanged portion 12, which is bored out at 13, as indicated in Fig. 3 of the drawings. The contact carrying members of my improved contouring tracer are preferably supported upon the head 11 and in the present form, they are mounted upon an annular disc 14 of insulating material which, in turn, is secured to and supported upon a short tubular hub or shaft 15, mounted to rotate in the head 11, which is counter-bored at 16 to form a bearing therefor. The annular insulating support 14 for the contact carrying members is held to rotate with the tubular shaft 15 by means of a suitable key 17, and a spacing member 18 is preferably placed between the annular member 14 and the bottom of the bore 13, as indicated in Fig. 3 of the drawings.

As more particularly described hereinafter, in this form of my improvement, it is preferred to rotate the contact carrying members to different positions according to the direction of feed desired in following the contour and, for this purpose, the tubular shaft 15 is rotatably mounted in the head and to the inner end thereof there is secured, by suitable screws 19, a bevel gear 20, adapted to mesh with a bevel pinion 21 secured to the end of a stud shaft 22, extending laterally through a bearing 23 in the head 11, as indicated in Figs. 1 and 3 of the drawings. The stud shaft 22 is preferably connected by means of a universal joint 24 with a rod 25, which may be provided with a suitable handle for rotating the rod and hence the contact members, as desired. Preferably, the rod 25, as indicated by dotted lines in Fig. 6 of the drawings, extends into a box 26 and the inner end thereof may be provided with a bevel pinion 27 cooperating with a bevel gear 28, secured to a handle 29, thereby providing means, located at a distance, for rotating the contact carrying members 14 to any desired position. Preferably, the handle 29 is connected with a pointer 30 adapted to cooperate with index points 31 mounted upon the face of the box 26 as indicated in Figs. 6 to 9 of the drawings. Only four index points 31, 90° apart, are here shown as representing the four rectangular directions of feed movement in a horizontal plane, but obviously, any other index markings may be employed when so desired.

Four contact carrying members 32 are mounted on the rotatable portion 14—15 of the head, one for each direction of feed movement to be controlled. The contact carrying members 32 (A, B, C, D) are preferably bell-crank shaped, as indicated in Fig. 2 of the drawings, and, at the angle thereof, are mounted upon pivot screws 33, which secure them to the outer end of the tubular hub or shaft 15, so that they are in electrical circuit therewith, thus forming a ground connection through the body 1 of the tracer with the machine upon which it is supported. The contact carrying members 32 are mounted at 90° apart and the inner ends 34 of the bell crank levers are adapted to lie tangent to the circular button end 35 of the tracer bar 3, which is reduced in size and extends through the head 11, and through the tubular shaft 15, as indicated in Fig. 3 of the drawings. The other arms 36 of the contact carrying members extend outward at right angles to the arms 34 and over the annular insulating disc 14, as will be seen in Fig. 2 of the drawings, and each contact carrying member arm 36 carries a contact 37 adapted to cooperate with a contact 38 on the end of a screw 39 secured in a split supporting bracket 40 embedded in or otherwise rigidly secured to the annular insulating disc 14, as indicated in Fig. 3 of the drawings. The screws 39 provide for adjusting the distance between the contacts 37 and 38 and may be clamped against movement in the split supporting bracket 40 by means of a suitable screw 41, as indicated in Fig. 3 of the drawings. Each of the brackets 40 which are shown embedded in the insulating member 14 is preferably connected to a quadrant 42 of suitable conducting material, which also may be embedded in the insulating material and extend around the outer periphery of the ring or member 14 substantially as indicated in Figs. 3 and 6 of the drawings.

The enlarged portion 12 of the head is preferably substantially square with the corners cut off and each corner is bored out as indicated at 43 and a tube 44 is inserted therein and suitably insulated from the head by bushings or washers 46, as indicated in the sectional portion of Fig. 2 of the drawings. Within each tube 44, there is preferably mounted a carbon cylinder contact brush 47, the inner end of which is adapted to rest upon and make contact with the quadrants 42. A suitable spring 48 is inserted in each tube 44, on top of the carbon brush 47, and is held in place by a screw cap 49, thereby providing the necessary pressure and resiliency for keeping the carbon brush 47 in contact with the quadrants 42 on the outer periphery of the member 14. Additional nuts 50 mounted upon the screw threaded end of the tube 44 are adapted to serve as lock nuts and provide means for securing the circuit wires thereto, which lead to the respective relays controlling the electric circuits of the different magnetic clutches for the feeds. Since the brushes 47 and quadrants 42 are adapted to cooperate to control the direction of feed of the cutter in the four rectangular directions, the brushes are preferably mounted 90° apart, as indicated in the drawings.

From the nature of the case, it will be understood that not more than two feeds can be in operation at once and these two feeds are preferably controlled by the contact carrying members 32 designated as A and B, which are provided with springs 51, secured to the respective bell crank arms 36 and to pins 52, as shown in Fig. 2 of the drawings. The springs 51 are of sufficient strength to normally hold the respective contacts 37—38 of the arms A and B closed and to move the tracer bar by their engagement with the button end 35. When the contacts of the members A and B are closed, as indicated in Fig. 2 of the drawings, the contacts of the arms C and D are open. This is effected by making the size of the circular end or button 35 on the tracer bar 3 of such diameter that the oppositely disposed contact carrying members 32 can not both be in position to close the respective contacts at the same time. In order to hold the contact carrying members C and D in engagement with the button end 35 of the tracer bar, suitable springs are employed which, in the present instance, comprises a floating spring 53, extending around pins 54 mounted in and projecting from the respective arms 34 of the contact carrying members. Obviously, in order that the springs 51 may be at all times effective to close the contacts of arms A and B, the springs 53, controlling the arms C and D, must be of less tension, and therefore, the floating arrangement of the spring 53 is preferable, in that the movement of the contact carrying members is at all times under the control of the button end 35 of the tracer bar.

As just stated, the springs 51 are of sufficient strength to move the tracer bar 3, by engagement of the arms 34 of the direct feed contact members A and B with the tracer bar button 35. The position of the contact members A and B is regulated by the contact screws 39, so as to center the tracer and tracer bar when the respective contacts thereof are closed. The diameter of the button 35 and the adjustment of the respective screws 39 is such that the contacts of the arms C and D are open when the contacts of the arms A and B are closed and there is sufficient space (regulated by screws 39) between the contacts 37 and 38 of the arms C and D, for the contacts of the arms A and B to be broken without closing the respective reverse feed contacts C and D. In this manner, the feeds controlled by the respective arms A and B may be stopped by engagement of the tracer point with the walls of the contour, as hereinafter explained. If, however, the pressure exerted against the tracer point 2 becomes excessive, such as might occur when the tracer strikes a hump or reversed curve, then the button 35 will be moved far enough to permit closing of one or the other of the contacts of the arms C, D, the contact thus closed controlling the reverse feed, so as to draw the tracer point away from the obstruction and release the pressure thereon. It will be understood, therefore, that during normal operation, when the tracer is following straight lines, the adjustment of the contacts of the arms C and D by means of the respective contact screws 39 is such that the reverse feeds will not be brought into operation, and ordinarily only one direct feed will be in operation, the other being stopped by the engagement of the tracer point with the wall of the contour along which the other feed is moving the tracer.

It sometimes happens that the tracer point 2 may be of such weight that the outer end of the tracer bar is overbalanced when the tracer is mounted in horizontal position and, in order that the movements thereof may be rendered more sensitive, it is preferable to provide a counter-balancing spring 55, which in the present instance, is simply a straight piece of spring wire, secured at 56 by a screw 57 in the end of a bracket arm 58 mounted upon the side of the head 12, as shown in Figs. 1 and 2 of the drawings. The bracket 58 is shown as T-shaped, the arms being slotted at 59 and cooperating respectively with a pin 60 and a screw stud 61, the latter being provided with a nut 62 for clamping the T-shaped bracket in any desired position of adjustment. In this manner the tension of the spring 55 may be adjusted, according to the tension required to counter-balance the tracer bar, so that the latter may be readily moved in any direction by the springs 51 of the contact carrying members A and B. It may be desired at times to mount the tracer with the actuating rod 22 extending horizontally and, in that case, the bracket 58 may be shifted to the upper side of the head 12, as shown in Fig. 2 of the drawings, and mounted upon the corresponding pin and screw 60$^a$ and 61$^a$ and held by a similar thumb nut 62$^a$.

In actual use of my improved contouring tracer, it has been found that when the tracer is moved at certain sharp angles the button 35 controlling the movements of the contact carrying members is apt to slide along one or the other of the arms 34 of the spring actuated contact carrying members A or B, without effectively breaking the contacts thereof and in that case the button 35 will actuate one or the other of the contact carrying members C and D to open them further. Advantage is taken of this to provide safety means for positively breaking the contacts of the arms A and B so as to avoid injury to either the tracer or the work. For this purpose, adjacent contact carrying members are preferably connected together by suitably slotted links 63, as indicated in Fig. 2 of the drawings. It will be seen that the two spring actuated contact carrying members A and B are thus connected respectively with the contact carrying members D and C, the contact carrying members A and C being each provided with an arm or lug 64 extending on the opposite side of the screw pivot 33 from the respective bell crank arms 34. Screws 65 and 66, extending respectively through holes 67 and 68 of the link 63, as shown in Fig. 4 of the drawings, make connection between the contact carrying arm B and the lug 64 of the contact member C and between the lug 64 of the member A and the contact carrying arm D. It will be seen, (Figs. 4 and 5) that the hole 68 of each link 63 is elongated so as to permit normal contact closing action of the contact carrying members C and D; but when these members are moved in the opposite direction to excessively open the contacts, the respective links 63 will be brought into action to forcibly open the contacts A and B, thus providing a safety device for opening the contacts and stopping the feed when the action is such that injury to the work or to the tracer is liable to take place.

In use, my improved contouring tracer, as hereinbefore described and in the form shown, is adapted to be connected through the brushes 47, with suitable relays, controlling the feeds in the four rectangular directions. The relays and their connections with suitable magnetic clutches are not shown herein, but such devices are well known to those skilled in the art and to the trade. Various forms and adaptations of the rotary magnetic clutches may be made to accommodate the operation of my improved contouring tracer in connection with machines of different types, and references may be had to my Patent No. 1,506,454 of Aug. 26, 1924, hereinbefore referred to, for a showing and description of rotary magnetic clutches controlling the feeds in an engraving machine.

The operation of my improved contouring tracer may be more particularly explained and understood in connection with the diagrammatic views shown in Figs. 6 to 10 inclusive. By reference to Fig. 6, it will be seen that the upper position of a rectangular contour is represented at 69, and the cutter (or tracer point 2) is represented at 70. In this particular view, (Fig. 6) the arrow indicates the direction of movement of the cutter and tracer, relative to the work and pattern, respectively. It will be understood that in these various diagrammatic views, the cutter or tracer is represented as moving in the four directions, for it is somewhat simpler to explain the operation in this manner. In practice, however, it is well known that, in machines of various types, in connection with which it may be desired to utilize my improved contouring tracer, the feed controls may, in some cases, move the tracer and cutter, while the work and pattern remains stationary and in other cases, the work and pattern may be moved while the tracer and cutter remain stationary or both the pattern and work and the cutter and tracer may be moved for the desired feeds. However, in either case, the relative movement can be correctly represented as shown in the diagrams of Figs. 6 to 10 inclusive.

Referring now to the diagrammatic showing in Fig. 6, it will be seen that the contact brushes 47 are connected respectively as follows:—the upper left hand brush to the relay controlling feed of the cutter toward the left; the upper right hand brush to the relay controlling the up feed; the lower left hand brush to the relay controlling down feed, and the lower right hand brush to the relay controlling feed toward the right.

When the rotatable contact carrying head, comprising the tubular hub or shaft 15 and the insulating ring 14 with the quadrants 42 and the associated contact carrying members A, B, C, D, is in the position shown in Fig. 6 of the drawings, the pointer 30 is indicated as pointing to the upper right hand index 31, and the contacts A and B are in the positions indicated on the drawing. In this view, it will be seen that the tracer point 2, by striking the upper horizontal edge of the contour 69, will force the button 35 to open the contact of the arm A, while the contact of the arm B remains closed. It will be seen that this will close the circuit through the quadrant 42 and brush 47 connected with the relay controlling feed toward the right, and hence, as indicated by the arrow, the relative feed between the cutter and the work will be toward the right. When the tracer point reaches the corner, the pressure against the right hand side of the contour will force the button 35 on the end of the tracer bar 3 to break the connection of the contact carried by the arm B, and the machine will stop the work, both feeds being stopped.

The operator now turns the handle 29 until the pointer 30 comes to the lower right hand index 31, as shown in Fig. 7 of the drawings, and this, through the rod 25 and bevel pinion and gear 21 and 20, will rotate the contact carrying disc 14 and quadrants 42 to the position shown in Fig. 7, or through a distance of 90°. In this position the contact of the arm A is still held open by lateral thrust against the right hand edge of the contour 69, but the contact carrying arm B, by means of its spring 51 holds its contacts closed and the circuit is completed through the relay controlling the down feed, thus feeding the cutter downward as indicated by the arrow in Fig. 7.

When the tracer point 2 reaches the lower right hand corner of the pattern, the contact member B will be actuated to break the contact and the down feed will cease, thus stopping further work by the machine until the operator again rotates the contact carrying head 90°. This next step is indicated in the diagram shown in Fig. 8 of the drawings, where it will be seen that the pointer 30 is turned to the lower left hand index 31, and the contact member B is now closed through the quadrant 42 connected with the relay controlling feed toward the left, and this feed movement is indicated by the arrow at the bottom of the diagram. From the previous explanation, it will be understood that feed toward the left will continue until the tracer point reaches the lower left hand corner of the contour of the pattern, when feed toward the left will cease for the tracer bar will again break the contact of the contact carrying member B.

The operator again, by means of the handle 29, rotates the pointer 30 to the index 31 at the upper left hand corner as shown in Fig. 9, and the contact carrying head will be in the position there shown. In this position the contact carrying member B will be again closed, but this time will complete the circuit through the relay controlling the up feed and, as indicated by the arrow in the diagram, the only feed that will take place is upward, and this will continue until the upper left hand corner is reached. This completes the circuit and brings the tracer and cutter back to the starting point, and the operation may be repeated by turning the handle 29 and pointer 30 to the position indicated in Fig. 6 of the drawings.

The contour represented in connection with the diagrams of Figs. 6 to 9 is a simple rectangle, but it will be readily understood that irregular contours of various kinds can be readily followed, one such contour being indicated in Fig. 10. When the tracer point, following the pattern of a contour as in Fig. 10, comes to a curve like that shown at 71, it will be seen that the pressure toward the left will be relieved and the contact carrying member A under the action of its spring 51 will close the circuit through the relay controlling feed toward the left and there will be simultaneous feed up and to the left, thus reproducing the contour, the feeds being substantially as indicated by the arrows at 71 in Fig. 10. When, however, the tracer point reaches the part of the contour indicated at 72 in Fig. 10, the up feed will be continued and excessive pressure of the tracer point will be such as to close the contact through the quadrant 42 connected with the relay controlling feed toward the right and the feeds will be substantially as indicated by the arrows at the curve 72.

However, for operating the machine when following irregularly shaped contours, it is preferable that the operator should turn the handle 29 approximately 45° or midway between two of the index points and then feeds in the two directions required can take place more satisfactorily. In this way, circles or irregular curves of any kind may be followed, and the cutter and tracer kept under the control of the operator at all times by means of the handle 29. In case the angles, such as those shown in Fig. 10, are too sharp to hold the tracer point from slipping, without fully breaking the contact of the arm B, for instance, the button 35 will slide along the arm 34 of the member B and will move the contact member C wider open and, through the link 63 connecting the two members, the contact of B will be forced open, thus preventing any injury to the pattern or to the work being reproduced. When a slip of this kind occurs, the head may be adjusted by turning the handle 29 so as to give the necessary feeding control in one or two directions as required without the possibility of injury to the tool or to the work.

While I have described my improvement as adapted to be operated in connection with machines having rectilinear feeds, it will be understood that the rotation of the contact control of the various feeds in the four directions may be accomplished in various ways and, therefore, I do not wish to be limited to the specific construction and arrangement shown for these may be varied in adapting my device to different types of machines and to different controls without departing from the spirit and scope of the invention.

I claim:—

1. In a contouring tracer, the combination with a head, of means mounted on the head for controlling the feed of the cutter in each of four rectangular directions, a tracer bar provided with a tracer adapted to follow the contour it is desired to reproduce and means operable by said tracer bar whereby lateral pressure on the tracer in following the contour is adapted to operate said feed controlling means to limit the amount of and determine the direction of feed.

2. In a contouring tracer, the combination of a tracer, for following the contour to be reproduced, and means controlled by the position and movements of said tracer for determining the amount and direction of feed of the cutter in one or more of four rectangular directions.

3. In a contouring tracer, the combination of a tracer, adapted to follow the contour to be reproduced, means controlled by the position and movements of said tracer for determining the amount and direction of feed of the cutter in one or more of four rectangular directions, and manual means for changing said feed control relative to the tracer at the will of the operator.

4. In a contouring tracer, the combination of a tracer, adapted to follow the contour to be reproduced, a tracer bar pivoted for universal lateral movement of said tracer which is mounted at one end thereof, a plurality of electric contact members controlled by the other end of said tracer bar, there being two direct and two reverse feed contact members for controlling the feed of the cutter in four rectangular directions, and resilient means for holding said tracer bar in and restoring it to normal position and for holding said contact members in normal relations with each other and with said tracer bar.

5. The mechanism as claimed in claim 4 in which means is provided for balancing the tracer bar and tracer, whereby said resilient means is rendered more sensitive.

6. In a contouring tracer, the combination with a tubular support, of a tracer bar passing therethrough, a ball and socket bearing substantially central of said tracer bar for supporting said bar for universal lateral movement of the ends thereof, a head mounted on said support and carrying electric contact members, a tracer point at one end of said bar adapted to follow the contour of the pattern to be reproduced, and means controlled by the other end of said tracer bar for determining which of said contacts shall be closed, said contact members being adapted to control the feed of the cutter in four directions.

7. In a contouring tracer, the combination of a tracer bar pivoted substantially central of its length for universal lateral movement of the ends thereof, a plurality of operating members arranged in a rectangle about one end of said tracer bar and adapted to be operated by lateral movement of said tracer bar, and means controlled by said members for feeding the cutter in one or more directions, the amount and direction of feed being determined by the position and movement of said tracer bar as the tracer is made to follow the contour.

8. In a contouring tracer, the combination with a tracer bar, of a head provided with contact brushes arranged 90° apart around the periphery thereof, a rotary member within said head, provided with conductor quadrants embedded in insulating material, contact carrying members cooperating with the respective quadrants, a tracer bar passing centrally through said rotatable member and cooperating with said contact members and means for rotating said rotary member for bringing the quadrants in successive engagement with said contact brushes.

9. The mechanism as claimed in claim 8, in which two of said contact carrying members lying adjacent are provided with springs of sufficient strength to center the tracer bar and hold the respective contacts thereof closed while the other contact members remain normally open, said first mentioned contacts being opened by lateral pressure of the tracer bar in opposition to said springs, and the other contacts are closed only when said pressure becomes excessive.

10. The mechanism as claimed in claim 8, in which two of said contact carrying members lying adjacent are provided with springs of sufficient strength to center the tracer bar and hold the respective contacts thereof closed and floating springs are provided for holding the other two of said contact carrying members in engagement with the end of said tracer bar.

11. In a contouring tracer, the combination with a head provided with four terminal connections, arranged about the head 90° apart, contact carrying members adapted to close the circuits through the respective terminals and a rotatable switch for changing the relation between said contact carrying members and the terminals.

12. In a contouring tracer, the combination with a tracer bar, of a head carrying four terminals adapted to control the feed of the cutter in four directions at right angles to the axis of the cutter, a contact carrying member arranged in each of four quadrant positions about the end of said tracer bar and adapted to engage said bar, said contact members being adapted for closing circuits through said terminals and resilient means connected with each of two of said contact carrying members for normally holding the respective contacts thereof closed, said resilient means being of sufficient strength to restore said tracer bar to normal position when released from opening said contacts, the relation between said contact carrying members and the end of the tracer bar being such that when the contacts operated by said resilient means are closed the contacts of the other two contact carrying members will be open, and the adjustment is such that the latter are closed by the tracer bar only upon excessive movement in opening said resiliently closed contacts.

13. The mechanism as claimed in claim 12, in which means is provided whereby said tracer bar is adapted for opening said resiliently closed contacts upon excessive movement of said tracer bar, when the angle of movement thereof is such that the direct pressure of the tracer bar against the arms of said resiliently closed contacts is insufficient for the purpose, thereby stopping the machine to avoid damage to the cutter or work.

14. The mechanism as claimed in claim 12, in which the contact carrying arms of the normally open contacts are held by floating springs to follow the movements of said tracer bar.

15. In a contouring tracer, means for controlling the feed of a cutter to synchronize its movement with those of a tracer following the pattern to be reproduced, which comprises a tracer bar, four terminals arranged in the quadrants of a circle about said tracer bar for the electrical control of the feed of the cutter in each of four rectangular directions, two direct and two reverse feed contact members adapted to be opened and closed respectively by lateral movements of the tracer bar, whereby the contacts thereof are adapted, through said terminals, to control the feeds of the cutter as the tracer follows the contour of the pattern, and means for rotating said contact members relative to said terminals for determining the direction of action of the tracer on said contact members, and for selecting the direct feeds required in following the pattern.

16. A contouring tracer comprising a tracer bar mounted for universal lateral movement, four terminals connected respectively with means for feeding the cutter in four directions, two direct and two reverse feed contact members cooperating through said terminals to control the feed of the cutter as the tracer follows the pattern, the direct feed contacts being normally closed and the reverse feed contacts normally open, and so arranged that lateral movement of said tracer bar is adapted to open and close the respective contacts, and means for changing the relations between said terminals and said contact members to vary the direction of the direct feeds under control of said tracer bar.

17. The mechanism as claimed in claim 16, in which interlocking means is provided whereby excessive movement of said tracer bar against one of the reverse feed contact members will break the contact of the next adjacent direct feed contact member to stop the feed controlled thereby.

JOHN C. SHAW.